(12) United States Patent
Yonemori et al.

(10) Patent No.: US 7,265,321 B2
(45) Date of Patent: Sep. 4, 2007

(54) WELDING EQUIPMENT FOR CONSUMABLE ELECTRODE

(75) Inventors: Shigeki Yonemori, Takarazuka (JP); Yukitoshi Yamada, Osaka (JP); Mitsunori Akaishi, Takarazuka (JP); Yukinori Hirota, Itami (JP); Tsutomu Naito, Itami (JP); Mituo Miyata, Toyonaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/555,621

(22) PCT Filed: Feb. 21, 2005

(86) PCT No.: PCT/JP2005/002721

§ 371 (c)(1),
(2), (4) Date: Nov. 4, 2005

(87) PCT Pub. No.: WO2005/080041

PCT Pub. Date: Sep. 1, 2005

(65) Prior Publication Data

US 2006/0207982 A1  Sep. 21, 2006

(30) Foreign Application Priority Data

Feb. 23, 2004  (JP)  ............................... 2004-045906

(51) Int. Cl.
  *B23K 9/10* (2006.01)
(52) U.S. Cl. ............................................. 219/137.71
(58) Field of Classification Search ........... 219/137.71, 219/132
  See application file for complete search history.

(56) References Cited

U.S. PATENT DOCUMENTS 4,608,482 A * 8/1986 Cox et al. ............... 219/137.71

FOREIGN PATENT DOCUMENTS

| DE | 2715993 A1 * | 10/1978 |
| JP | 50-49136 | 5/1975 |
| JP | 2002-239730 A * | 8/2002 |
| JP | 2002-283052 | 10/2002 |

OTHER PUBLICATIONS

International Search Report, dated May 24, 2005.

* cited by examiner

*Primary Examiner*—Clifford C. Shaw
(74) *Attorney, Agent, or Firm*—Pearne & Gordon LLP

(57) ABSTRACT

In a case where a motor 3 is stopped upon completion of welding, a motor stop can be effected irrespective of the length of control lines by disposing a first motor stop means 5a or a second motor stop means 5b in a feeding means 2.

4 Claims, 4 Drawing Sheets

WELDING EQUIPMENT FOR CONSUMABLE ELECTRODE

TECHNICAL FIELD

The present invention relates to a welding apparatus for a consumable electrode for effecting welding by feeding a welding wire and generating an arc between the welding wire and a base metal.

BACKGROUND ART

The wire feeding means of a conventional welding apparatus for a consumable electrode is arranged such that after a switching device is closed, both ends of a motor coil are short-circuited or connected through resistance so as to speedily lower the counter electromotive voltage generated by a motor portion and reduce the rotational energy of the motor portion, thereby applying a brake (e.g., refer to patent document 1).

Referring to FIG. 4, a description will be given of this conventional configuration.

FIG. 4 shows the configuration of the welding wire feeding means of a conventional welding apparatus for a consumable electrode. Reference numeral 101 denotes a welding power supply; 102, a feeding means for feeding a welding wire by a drive current from the welding power supply 101; 103, a motor disposed inside the feeding means 102; 104, a motor control means disposed inside the welding power supply 101; 104a, a switching device for controlling the drive current of the motor 103 by effecting the opening and closing operation by means of the motor control means 104; 105, a motor stop means constituted by a switching device which is opened when driving the motor 103 and is closed when stopping the motor 103 by the motor control means 104; and 106, a motor driving power supply. Reference numerals 107a and 107b denote control lines for connecting the welding power supply 101 and the feeding means 102.

In addition, the motor driving power supply 106 forms a circuit by series connection of the motor driving power supply 106, the switching device 104a, and the motor 103.

In addition, the motor stop means 105 is connected to a node between the switching device 104a and the motor 103 and to the other end of the motor 103, i.e., to both ends of the motor 105.

In addition, the connection is provided such that a control signal of the motor control means 104 is inputted to an input end of an open/close control signal of the switching device 104a, and such that a control signal is inputted to an input end of an open/close control signal of the switching device of the motor stop means 105.

As for its operation, when a motor drive signal from the motor control means 104 to the switching device 104a becomes OFF, the switching device 104a is set in an open state.

Meanwhile, the motor control means 104 outputs a signal for closing the circuit to the motor stop means 105 so as to speedily lower the counter electromotive voltage generated by the motor 103 and reduce the rotational energy of the motor 103, thereby applying a brake.

Patent document 1: JP-A-2002-283052

DISCLOSURE OF THE INVENTION

Problems to be Solved by the Invention

However, with the conventional welding apparatus for a consumable electrode, it has been necessary to make the control lines 107a and 107b long as the distance between the welding power supply 101 and the feeding means 102 becomes long.

Accordingly, when stopping the motor 103, a resistance component increases as the control lines 107a and 107b become long, and even if the motor stop means 105 is driven, the motor 103 stops slowly through the resistance generated by the control lines 107a and 107b.

Therefore, there has been a problem in that the stopping time when stopping the motor 103 becomes long, and if the control lines 107a and 107b are extended, the welding wire becomes likely to be fused to the base metal subject to work upon completion of the welding.

An object of the invention is to provide a welding apparatus for a consumable electrode in which the stopping time of the motor is not affected even if the control lines are extended.

Means for Overcoming the Problem

To attain the above object, in accordance with the invention there is provided a welding apparatus for a consumable electrode, comprising: a welding power supply; feeding means for feeding a welding wire; a motor used in the feeding means; motor control means for controlling the drive of the motor; and motor stop means for stopping the motor, wherein the motor control means is disposed in the welding power supply, the motor stop means is disposed in the feeding means, and the motor control means, the motor stop means, and the motor are connected by control lines.

According to this configuration, the length of the control lines between the motor stop means and the motor is unrelated to the distance between the welding power supply and the feeding means, and even if the control lines between the welding power supply and the feeding means are extended, the stopping time of the motor is not affected.

In addition, in accordance with the invention there is provided a welding apparatus for a consumable electrode, comprising: a welding power supply; feeding means for feeding a welding wire; a motor used in the feeding means; motor control means for controlling the drive of the motor; and first motor stop means for stopping the motor, wherein the motor control means and the first motor stop means are disposed in the welding power supply, wherein the feeding means has detecting means for detecting at least one of an electric current, a voltage, and electric power to be supplied to the motor, comparing means for comparing a detected value of the detecting means and a set value during the drive of the motor, and second motor stop means for stopping the motor by an output from the comparing means, and wherein the motor control means, the first motor stop means, the second motor stop means, and the motor are connected by control lines.

According to this configuration, the length of the control lines between the second motor stop means and the motor is unrelated to the distance between the welding power supply and the feeding means, and even if the control lines between the welding power supply and the feeding means are extended, the stopping time of the motor is not affected.

As described above, in accordance with the invention, it is possible to provide with a simple and inexpensive configuration a welding apparatus for a consumable electrode in which the stopping time of the motor is not affected even if the distance between the welding power supply and the wire feeding means becomes long.

DESCRIPTION OF REFERENCE NUMERALS AND SIGNS

Figure 1:
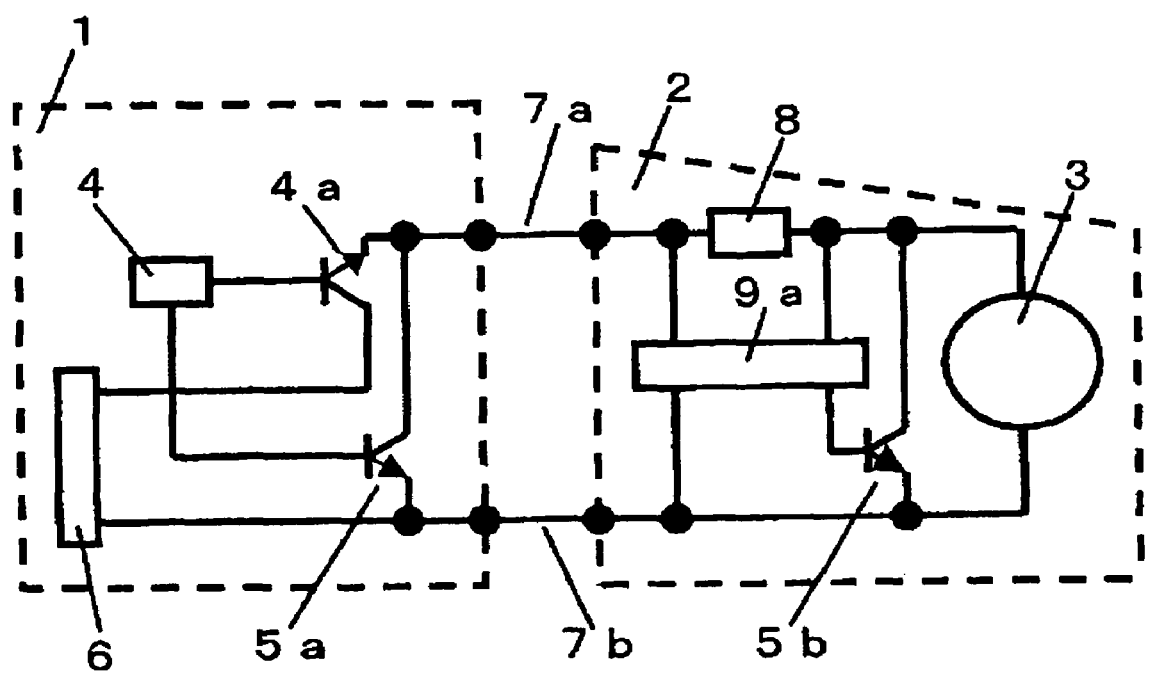
FIG. 1 is a block diagram in accordance with a first embodiment of the invention.

1: welding power supply
2: feeding means
3: motor
4: motor control means
5a: first motor stop means
5b: second motor stop means
6: motor driving power supply
7a, 7b: control lines
8: detecting means
9a, 9b: comparing means

BEST MODE FOR CARRYING OUT THE INVENTION

Hereafter, a description will be given of the best mode for carrying out the invention with reference to the drawings.

First Embodiment

In FIG. 1, reference numeral 1 denotes a welding power supply; 2, a feeding means for feeding a welding wire by a drive current from the welding power supply 1; 3, a motor disposed inside the feeding means 2, 4, a motor control means disposed inside the welding power supply 1; 4a, a switching device for controlling the drive current of the motor 3 by effecting the opening and closing operation by means of the motor control means 4; 5a, a first motor stop means constituted by a switching device which is opened when driving the motor 3 and is closed when stopping the motor 3 by the motor control means 4; and 6, a motor driving power supply. Reference numerals 7a and 7b denote control lines for connecting the welding power supply 1 and the feeding means 2. These arrangements are substantially the same as the conventional arrangements.

Here, a description will be given of a configuration characterizing this first embodiment.

Reference numeral denotes a detecting means provided in a portion inside the feeding means 2 of the control line 7a. Here, a shunt resistor which is capable of generating a voltage by the motor current is used.

Reference numeral 9a denotes a comparing means, which is connected to both ends of the detecting means 8 (shunt resistor), compares the voltage generated by the detecting means 8 and a preset voltage, determines whether or not a drive current is being supplied to the motor 3, and sends a control signal. In addition, this comparing means 9a has therein a charging power supply (not shown), and is connected between the control lines 7a and 7b to effect charging by the motor drive current. After charging, the comparing means 9a is so arranged as to be capable of continuing to output a control signal for a predetermined time period irrespective of the presence or absence of the motor drive current.

Reference numeral 5b denotes a second motor stop means, which is so connected as to set both ends of the motor 3 in a closed state by a control signal from the comparing means 9a when stopping the motor 3.

Next, a description will be given of the operation.

First, when welding, a welding wire is fed by imparting a motor drive current from the motor driving power supply 6 to the motor 3 such that a desired feeding rate (substantially fixed rate) of the welding wire (not shown) will be obtained. Welding electric power is supplied from the welding power supply 1 to between the welding wire and a base metal (not shown) to generate an arc, thereby effecting welding.

To obtain this desired feeding rate (substantially fixed rate) of the welding wire, a required motor drive current is supplied to the motor 3 in the feeding means 2 via the control lines 7a and 7b while controlling the opening/closing operation of the switching device 4a by the motor control means 4. At the same time, a control signal for setting the first motor stop means 5a in an open state is outputted from the motor control means 4 to the first motor stop means 5a.

When the motor drive current flows, the charging power supply means in the comparing means 9a also starts charging.

In addition, when the motor drive current flows across the detecting means 8, a voltage is generated across its both ends. If the comparing means 9a determines that this generated voltage is a preset voltage or more, the comparing means 9a outputs to the second motor stop means 5b a control signal for setting the second motor stop means 5b in the open state (OFF signal).

In a state in which the comparing means 9a has not been charged, this second motor stop means 5b is unable to effect a closed state (motor stop), so that the second motor stop means 5b is in a motor stop canceled state with respect to the motor 3.

Meanwhile, in a state in which the comparing means 9a has been charged, the second motor stop means 5b is in a state in which it is capable of responding to the control signal, so that the second motor stop means 5b maintains the motor stop canceled state if a predetermined amount of the motor drive current is flowing.

Next, to stop the motor 3 upon completion of welding, a control signal for shutting off the motor drive current is outputted from the motor control means 4 to the switching device 4a, and a control signal for setting the first motor stop means 5a in the closed state is outputted from the motor control means 4 to the first motor stop means 5a.

At this time, the motor 3 tends to continue rotating in accordance with the inertia and generates an induced voltage, and the current flows in the opposite direction to the direction of the current which was flowing until then.

Accordingly, a negative voltage opposite to the one when driving the motor is generated in the detecting means 8.

Upon receiving this voltage, the comparing means 9a determines that the voltage has become less than the preset voltage, the comparing means 9a outputs to the second motor stop means 5b a control signal for setting the second motor stop means 5b in the closed state (ON signal).

Then, the second motor stop means 5b short-circuits both terminals of the motor 3 to stop the motor 3.

It should be noted that, in this embodiment, it is ensured that the comparing means 9a is able to make accurate determinations by setting as the preset value an appropriate value corresponding to the welding conditions.

As described above, according to this embodiment, the comparing means 9a detects that the voltage has become less than the preset voltage by the detected value from the detecting means 8 at the time of stopping the motor, and on the basis of this the second motor stop means 5b is able to effect the stop operation, and is able to effect the stop operation of the motor 3 irrespective of the distances of the control lines 7a and 7b between the welding power supply 1 and the feeding means 2.

Second Embodiment

Figure 2:
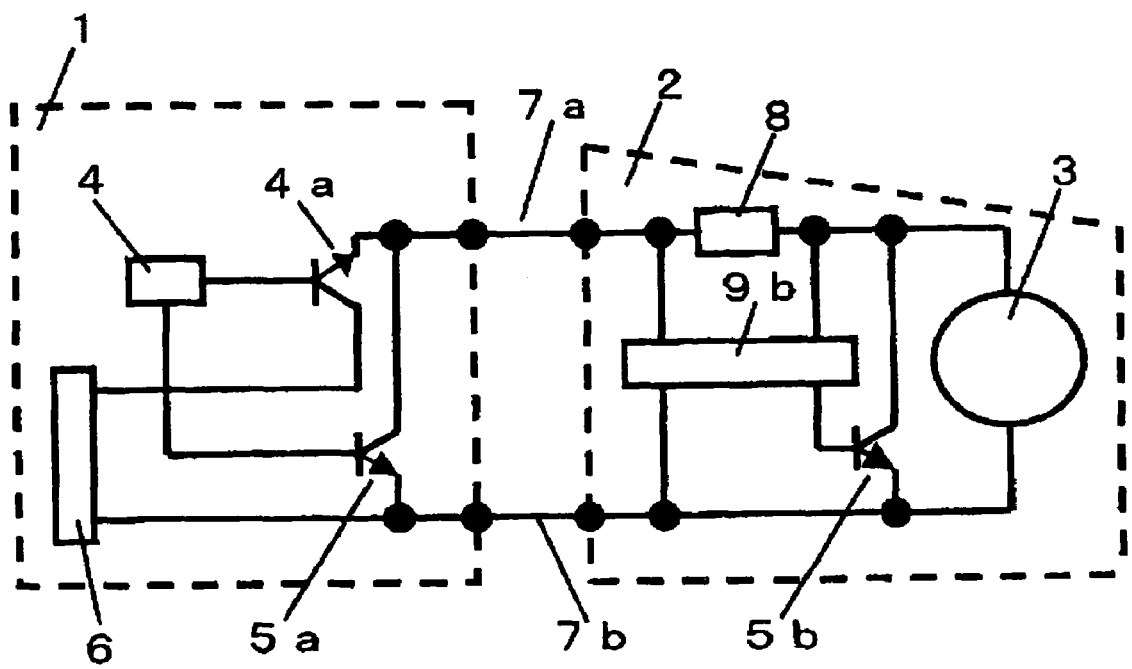
FIG. 2 is a block diagram in accordance with a second embodiment of the invention.

In FIG. 2, the arrangements similar to those of the first embodiment will be denoted by the same reference numerals, and a description thereof will be omitted.

The configuration characterizing this embodiment lies in a comparing means 9b, and a difference in the configuration lies in that 0s are used as the detected value from the detecting means 8 and the preset value.

Namely, the difference with the first embodiment lies in that there is provided a positive/reverse determining circuit which outputs to the second motor stop means 5b a control signal for setting the second motor stop means 5b in the open state (OFF signal) in a case where the value of the detecting means 8 (a voltage in the case where the shunt resistor is used) is of a positive polarity, and which outputs to the second motor stop means 5b a control signal for setting the second motor stop means 5b in the closed state (ON signal) in a case where the value of the detecting means 8 (a voltage in the case where the shunt resistor is used) is of a negative polarity.

Hereafter, a description will be given of the operation in this embodiment.

First, when welding, the welding wire is fed by imparting a motor drive current from the motor driving power supply 6 to the motor 3 such that a desired feeding rate (substantially fixed rate) of the welding wire (not shown) will be obtained. Welding electric power is supplied from the welding power supply 1 to between the welding wire and the base metal (not shown) to generate an arc, thereby effecting welding.

To obtain this desired feeding rate (substantially fixed rate) of the welding wire, a required motor drive current is supplied to the motor 3 in the feeding means 2 via the control lines 7a and 7b while controlling the opening/closing operation of the switching device 4a by the motor control means 4. At the same time, a control signal for setting the first motor stop means 5a in the open state is outputted from the motor control means 4 to the first motor stop means 5a.

When the motor drive current flows, the charging power supply means in the comparing means 9a also starts charging.

In addition, when the motor drive current flows across the detecting means 8, a voltage of a positive polarity is generated across its both ends, and the comparing means 9b outputs to the second motor stop means 5b a control signal for setting the second motor stop means 5b in the open state (OFF signal).

In a state in which the comparing means 9a has not been charged, this second motor stop means 5b is unable to effect the closed state (motor stop), so that the second motor stop means 5b is in the motor stop canceled state with respect to the motor 3.

Meanwhile, in a state in which the comparing means 9a has been charged, the second motor stop means 5b is in a state in which it is capable of responding to the control signal, so that the second motor stop means 5b maintains the motor stop canceled state if a predetermined amount of the motor drive current is flowing.

Next, to stop the motor 3 upon completion of welding, a control signal for shutting off the motor drive current is outputted from the motor control means 4 to the switching device 4a, and a control signal for setting the first motor stop means 5a in the closed state is outputted from the motor control means 4 to the first motor stop means 5a.

At this time, the motor 3 tends to continue rotating in accordance with the inertia and generates an induced voltage, and the current flows in the opposite direction to the direction of the current which was flowing until then.

Accordingly, since a voltage of a reverse polarity opposite to the one when driving the motor is generated in the detecting means 8, the comparing means 9b outputs to the second motor stop means 5b a control signal for setting the second motor stop means 5b in the closed state (ON signal).

Then, the second motor stop means 5b short-circuits both terminals of the motor 3 to stop the motor 3. When the rotation of the motor 3 stops, the voltage of the reverse polarity fails to be generated in the motor 3, so that the comparing means 9b outputs an OFF signal to the second motor stop means 5b to cancel the motor stop.

As described above, according to this embodiment, there are advantages in that by detecting the voltage of the reverse polarity at the time of the motor stop, it is possible to effect the stop operation of the motor 3 irrespective of the distances of the control lines 7a and 7b between the welding power supply 1 and the feeding means 2, and that since the cancellation of the motor stop in the second motor stop means 5b can be effected immediately after the motor stop, even if a restart is effected until the comparing means 9b is discharged, the changeover time in the motor stop cancellation is not delayed.

Third Embodiment

Figure 3:
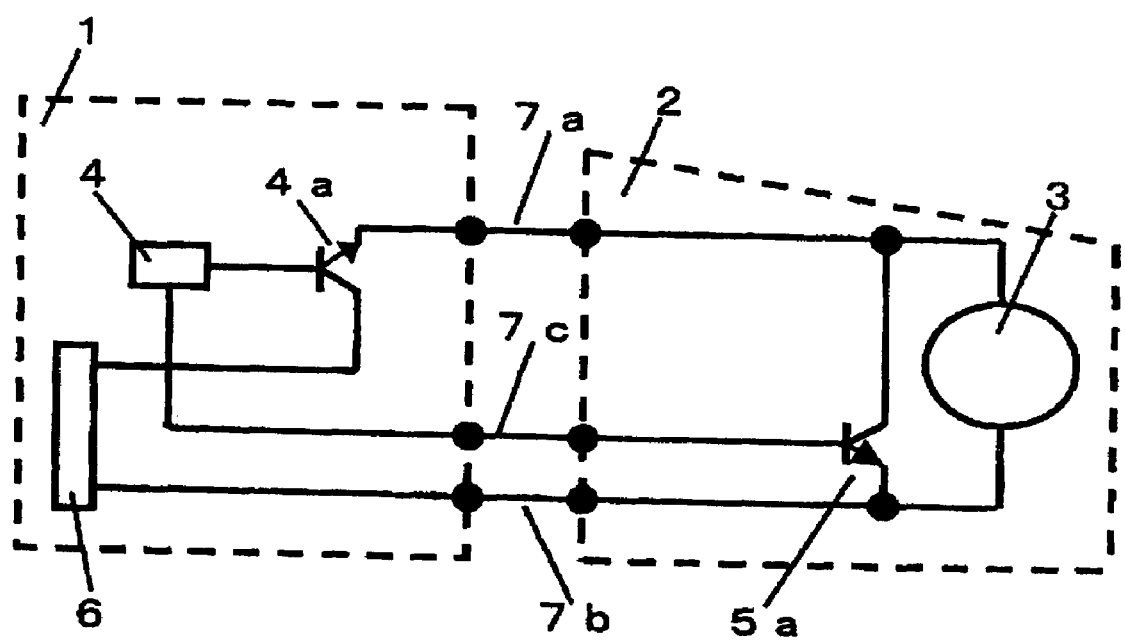
FIG. 3 is a block diagram in accordance with a third embodiment of the invention.
Figure 4:
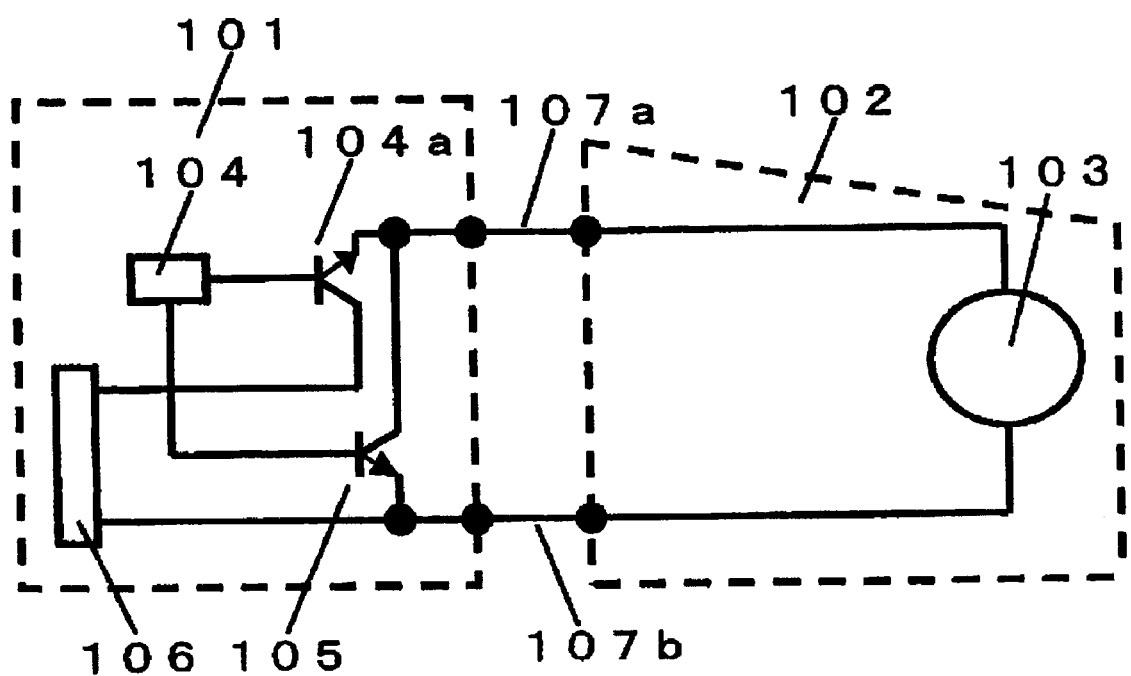
FIG. 4 is a block diagram of a conventional welding apparatus for a consumable electrode.

In FIG. 3, the arrangements similar to those of the first and second embodiments will be denoted by the same reference numerals, and a description thereof will be omitted.

The configuration characterizing this embodiment lies in the position where the first motor stop means 5a is disposed, and there is a difference with the first embodiment in that the first motor stop means 5a is provided in the feeding means 2.

For this reason, a control line 7c from the motor control means 4 to the first motor stop means 5a is provided between the welding power supply 1 and the feeding means 2.

Hereafter, a description will be given of the operation in this embodiment.

First, when welding, the welding wire is fed by imparting a motor drive current from the motor driving power supply 6 to the motor 3 such that a desired feeding rate (substantially fixed rate) of the welding wire (not shown) will be obtained. Welding electric power is supplied from the welding power supply 1 to between the welding wire and the base metal (not shown) to generate an arc, thereby effecting welding.

To obtain this desired feeding rate (substantially fixed rate) of the welding wire, a required motor drive current is supplied to the motor 3 in the feeding means 2 via the control lines 7a and 7b while controlling the opening/closing operation of the switching device 4a by the motor control means 4. At the same time, a control signal for setting the first motor stop means 5*a* in the open state is outputted from the motor control means 4 to the first motor stop means 5*a* via the control line 7*c*.

Next, to stop the motor 3 upon completion of welding, a control signal for shutting off the motor drive current is outputted from the motor control means 4 to the switching device 4*a*, and a control signal for setting the first motor stop means 5*a* in the closed state is outputted from the motor control means 4 to the first motor stop means 5*a*.

At this time, the motor 3 tends to continue rotating in accordance with the inertia and generates an induced voltage, and the current flows in the opposite direction to the direction of the current which was flowing until then. However, since the first motor stop means 5*a* is in the closed state, it is possible to speedily lower the counter electromotive voltage generated in the motor 3 can be lowered speedily, and reduce the rotational energy of the motor 3, thereby applying a brake.

As described above, according to this embodiment, since the first motor stop means 5*a* is disposed in the feeding means 2, it is possible to effect the stop operation of the motor 3 irrespective of the distances of the control lines 7*a* and 7*b* between the welding power supply 1 and the feeding means 2.

Although the invention has been described in detail and by referring to specific embodiments, it will be apparent to those skilled in the art that various changes and modifications may be made thereto without departing from the spirit and scope of the invention.

This application is based on Japanese Patent Application filed on Feb. 23, 2004 (Japanese Patent Application No. 2004-45906), the contents of which are incorporated herein by reference.

INDUSTRIAL APPLICABILITY

The welding apparatus for a consumable electrode in accordance with the invention makes it possible to stop the motor stably even if the distance between the welding power supply and the feeding means becomes long, and it is useful when used by making the distance between the welding power supply and the feeding means long in the construction equipment industry, the automobile industry, the shipbuilding industry, and the like.

The invention claimed is:

1. A welding apparatus for a consumable electrode, comprising:
   a welding power supply;
   feeding means for feeding a welding wire;
   a motor used in the feeding means;
   motor control means for controlling the drive of the motor; and
   first motor stop means for stopping the motor,
   wherein the motor control means and the first motor stop means are disposed in the welding power supply,
   wherein the feeding means has detecting means for detecting at least one of an electric current, a voltage, and electric power to be supplied to the motor, comparing means for comparing a detected value of the detecting means and a set value during the drive of the motor, and second motor stop means for stopping the motor by an output from the comparing means, and
   wherein the motor control means, the first motor stop means, the second motor stop means, and the motor are connected by control lines.

2. The welding apparatus for a consumable electrode according to claim 1, wherein if the detected value of the detecting means is not less than a fixed range, the second motor stop means is made inoperative, whereas if the detected value of the detecting means is less than the fixed range, the second motor stop means is operated to stop the motor.

3. The welding apparatus for a consumable electrode according to claim 1, wherein the voltage is used as the detected value of the detecting means, and if the detected potential is of a positive polarity, the second motor stop means is made inoperative, whereas if the detected potential is of a reverse polarity, the second motor stop means is operated to stop the motor.

4. The welding apparatus for a consumable electrode according to claim 1, wherein the welding apparatus further comprises a switching device for controlling a drive current of the motor,
   wherein the motor control means operates the switching device for controlling the drive of the motor.

* * * * *